United States Patent [19]

Foster et al.

[11] Patent Number: 4,789,441
[45] Date of Patent: Dec. 6, 1988

[54] METALLIC PROTECTIVE COATINGS AND METHOD OF MAKING

[76] Inventors: John Foster, 3 Collingwood Close, Worle, Avon; Eric C. Kedward, 2 Littlefields Rd., Banwell, Avon; Francis J. Honey, Elmside, 26 Kingsway Rd., Burnham on Sea, Somerset TA8 1ET; James E. Restall, 18 Aphington Ave., Frimley, Camberley Surrey, all of United Kingdom

[21] Appl. No.: 784,349

[22] Filed: Oct. 4, 1985

[30] Foreign Application Priority Data

Oct. 5, 1984 [GB] United Kingdom ............... 8425262

[51] Int. Cl.$^4$ .................... C25D 3/12; C25D 5/50
[52] U.S. Cl. .................... 204/37.1; 204/48; 204/49; 428/558; 428/614
[58] Field of Search .................... 204/37.1, 48, 49, 16; 428/678, 679, 680, 688, 614, 558, 559

[56] References Cited

U.S. PATENT DOCUMENTS 3,830,711 8/1974 Kedward et al. ............... 204/43 T
4,152,223 5/1979 Wallace et al. ............... 204/37.1
4,302,322 11/1981 Oda et al. ............... 204/293

FOREIGN PATENT DOCUMENTS 1218179 1/1971 United Kingdom .
1329081 9/1973 United Kingdom .
1347184 2/1974 United Kingdom .
2014189 8/1979 United Kingdom .

OTHER PUBLICATIONS

F. A. Lowenheim, *Electroplating*, McGraw-Hill Book Co., New York, 1978, pp. 389-399.

*Primary Examiner*—John F. Niebling
*Assistant Examiner*—William T. Leader
*Attorney, Agent, or Firm*—Ralph R. Rath

[57] ABSTRACT

A substrate such as a single crystal gas turbine blade is given a protective coating by composite electrodeposition of a metal matrix $M_1$ containing particles of $CrAlM_2$, where $M_1$ is Ni or Co or Fe and $M_2$ is Y, Si, Ti, or a rare earth element. The preferred matrix is Ni or Co or NiCo and the preferred particles are CrAlY. The particle size is important and preferably 75% by weight are between 3.9 and 10.5 $\mu$m. The coating is heat treated to produce interdiffusion between the constituents of the matrix and the particles.

23 Claims, 2 Drawing Sheets

METALLIC PROTECTIVE COATINGS AND METHOD OF MAKING

DESCRIPTION

Technical Field

This invention relates to metallic protective coatings suitable for the protection of substrates intended to operate in hostile environments to provide improved resistance to one or more of oxidation, corrosion and erosion. The invention also relates to processes for the production of such coatings. Such coatings may be used for various purposes but are particularly valuable for the protection of high temperature aerofoil components such as rotor blades and stator vanes of gas turbines. Such coatings are employed to enable materials for the components to be selected with greater consideration for their structural characteristics and lesser consideration for their resistance to corrosion and the like. Examples of such materials are the so-called super-alloys and particularly unindirectionally solidified and single crystal components.

BACKGROUND PRIOR ART

There is described in EP-B1-0 024 802 a gas turbine blade fabricated from a nickel-based alloy which is provided by the plasma arc spraying technique with an overlay coating of CoCrAlY. This coating may suffer from microporosity and is therefore given a further coating of aluminium by a pressure pulse chemical vapour deposition process. This two stage process has been found to give good results but is expensive and it is thought that it is not in commerical use. Two processes for the production of overlay coatings which are used for the purpose described are plasma spraying and electron beam techniques. However, these are both expensive.

It is accordingly an object of the present invention to provide a coating which has good properties while being reasonable in price.

SUMMARY OF THE INVENTION

This invention is believed to reside in one of the features set out in the immediately following paragraphs or in one of the novel features included in the later parts of this specification relating to more detailed examples or to any compatible combinations from either one or from both of the two aforementioned groups of features and it is to be emphasised that such combinations have been envisaged and are intended to be disclosed hereby, even though not all of them are at present claimed.

According to one aspect of the present invention a coating is provided by composite electro- deposition, on a substrate, of a metal matrix $M_1$ containing particles of $CrAlM_2$ where $M_1$ is Ni or Co or Fe or two or all of these metals and $M_2$ is Y, Si, Ti, a rare earth element or two or more of these elements. Preferably $M_1$ is Ni or Co or NiCo. The electrodeposition may be electrolytic or electroless. Examples of apparatus and processes which may be used are described in UK-A-1 218 179, 1 329 081 and 1 347 184, it being preferred to use those described in UK-B-2 014 189. The preferred particles are CrAlY. The particles could also contain one or more of Hf, Ta, Nb, Mn and Pt.

By electrodeposition there can be produced a coating in which particles forming one phase are dispersed in a matrix forming a second phase and such a coating has very desirable properties, and surface finish. The composite coatings may be contrasted with those produced by spraying techniques.

The coatings will in practice be heat treated to improve their properties. An effect of heat treatment is to produce diffusion between the matrix and the particles so that the matrix of $M_1$ also contains some Cr, Al and $M_2$ while the particles also contain some $M_1$. For some applications, it is possible to treat the coating to a hot isostatic pressing (HIP) cycle to remove any traces of porosity in the coating. For example, where the matrix $M_1$ is Ni, the coating and, of course, its substrate may be given a HIP cycle of 2 hours at 1120° C. in argon at 140 MPa.

It has been found that outstandingly good results are obtained by the close control of the particle size distribution. Thus, it has been found that for the best results particles in the as-deposited coating larger than about 15 $\mu/m$ should be avoided so far as is practicable and it is therefore preferred that at least 99% of the particles co-deposited in the coating are below 25 $\mu m$. An additional or alternative preference is that at least 97% of the co-deposited particles are below 15 $\mu m$. A further additional or alternative preference is that at least 84% of the co-deposited particles are below 10.5 $\mu m$. Particularly preferred distributions include: more than 95% by weight with particle sizes between 3.0 and 13.6 $\mu m$, more than 75% between 3.9 and 10.5 $\mu m$, and more than 65% between 5.0 and 10.5 $\mu m$, these limits being applicable individually or cumulatively and separately or in combination with one or more of the immediately preceding preferences for the proportions below 25$\mu m$, 15$\mu m$ and 10.5 $\mu m$ respectively. For most conditions of co-deposition, these as-deposited limits will be achieved by applying the same limits to the size distribution of the particles in the bath but for this to be the case care must be taken that adequate means are employed to ensure even distribution of the particles throughout the bath.

It has been mentioned above that the coating is preferably heat treated to obtain interdiffusion between the constituents of the matrix and the particles. While diffusion of more than one of the constituents contributes to the excellent properties of the coatings of the invention, it is thought that diffusion of Al from the particles into the matrix is particularly valuable since the availability of Al at the surface of the coating will lead to the formation of aluminium oxides at the surface when the coated component is in use and aluminium oxides are known to provide excellent erosion and corrosion resistance in hostile environments such as those encountered by the blades and vanes of gas turbines. Preferably, the temperatures and durations of the heat treatment are selected to produce a minimum of 3 weight percent wt % of Al in the matrix phase of the coating and high Al values may be beneficial up to values approaching the maximum amount of Al which is soluble in the matrix phase (thought to be about 4.2 wt % for Al in Co).

To achieve adequate diffusion, it is probable that the lowest effective temperature will be 700° C. but to achieve rapid diffusion high temperatures are preferred, one suitable range being between 1050° C. and 1150° C., that between 1100° C. and 1140° C. being particularly preferred, the necessary duration being between one half and two and one half hours. Very good results have been achieved with one to two hours at 1100° C. in vacuum, but longer times may be beneficial in some cases and in particular if lower temperatures are used.

The proportions of the constituents of the particles may vary within wide limits but preferably the proportions of Cr and Al range between 80/20 and 50/50 while the content of $M_2$ in the particles will be substantially less than the other two constituents, preferably less than 2.5 wt %, preferably less than 2.0 wt %. Particularly preferred proportions are Cr —37.3 wt % Al 0 1.7 wt % Y. Although CoCrAlY coatings are suitable for many application, for example for aero engines, those of NiCoCrAlY and CoNiCrAlY may be preferred for these and other applications. For marine and industrial power plants coatings containing high percentages of chromium (e.g. up to 40 weight percent) and with silicon (e.g. up to 10 weight percent), platinum (e.g. up to 10 weight percent) and hafnium (e.g. up to 5 weight percent) may be required.

It will now be appreciated that the preferred features of the invention may be characterised in various ways. Thus according to one aspect (and realising that the invention has many broader aspects), the invention may be seen to reside in a substrate carrying an overlay coating of $M_1CrAlM_2$ (where $M_1$ is Co, Ni or NiCo and $M_2$ is Y, Si, Ti or two or all of these but preferably Y) applied by electrodeposition of a matrix of $M_1$ and particles of $CrAlM_2$ having in the as-deposited state more than 97% by weight of the particles below 15 μm, the coating having been heated treated to produce a minimum of 3 weight percent of Al in the matrix.

DETAILED DESCRIPTION OF EXAMPLES

The invention may be carried into practice in various ways but three Examples will now be given.

Rods of MarMOO2 were coated by the techniques and apparatus described in UK Pat. No. 2 014 189, which discloses the application of a composite coating comprising a cobalt matrix including chromium carbide particles where the bath has particles of chromium carbide power in the range of about 17 to 33.2 wt %. The teachings of UK Pat. No. 1218179 could also be followed in carrying the subject invention into practice. This patent discloses co-deposition of a moldenum disulphide in a cobalt matrix wherein the moldenum disulphide particle content is about 5% by volume. Of course, proper substitution of materials is necessary for carrying out the present invention.

In Example A, the bath contained a CoNi plating solution and the particles were of CrAlY containing 60 parts by weight Cr to 40 parts Al and 1.7 wt % Y with a size distribution, both in the bath and in the as-deposited coating, as given in Column A of the following Table.

TABLE

| COATING SIZE BAND | A | B | C |
|---|---|---|---|
| | \multicolumn{3}{c}{Weight Percent} | | |
| 118.4 | 54.9 | 0 | 0 |
| 54.9 | 33.7 | 0.2 | 0 |
| 33.7 | 23.7 | 2.9 | 0.3 | 0.1 |
| 23.7 | 17.7 | 5.9 | 1.3 | 0.7 |
| 17.7 | 13.6 | 14.8 | 4.3 | 2.9 |
| 13.6 | 10.5 | 20.2 | 17.7 | 11.7 |
| 10.5 | 8.2 | 28.1 | 38.1 | 30.5 |
| 8.2 | 6.4 | 12.4 | 18.3 | 21.1 |
| 6.4. | 5.0 | 7.8 | 12.3· | 18.0 |
| 5.0 | 3.9 | 7.5 | 8.2 | 9.8 |
| 3.9 | 3.0 | 0.2 | 0.1 | 5.1 |
| 3.0 | 2.4 | 0 | 0 | 0.1 |
| 2.4 | 1.9 | 0 | 0 | 0 |

Figure 1:
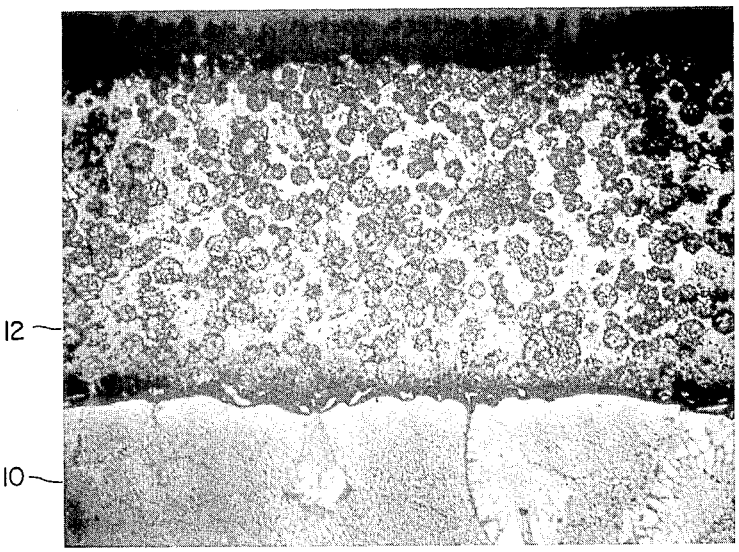
FIGS. 1, 2 and 3 are photomicrographs showing the coatings produced respectively in the following Examples A, B and C wherein reference numeral 10 identifies the substrate and reference numeral 12 identifies the coating.

After plating, the rod with the composite overlay coating thereon was given a heat treatment of one hour at 1100° C. in vacuum. A micrograph (at an original magnification of X400) of the coating after heat treatment is shown in FIG. 1. The coating comprises a matrix of CoNi into which amounts of Cr, Al and Y have diffused and particles into which amounts of Co and Ni have diffused. The matrix has approximately 20% Cr and approximately 4% Al. The coating has good properties.

Figure 2:
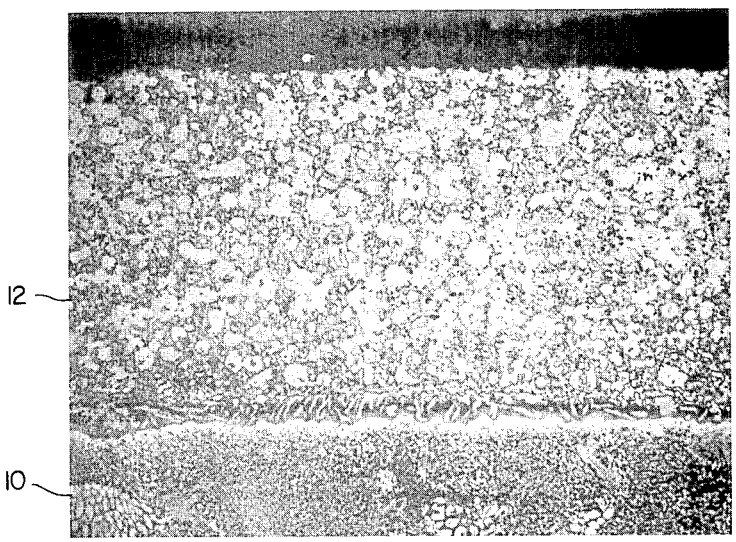

In Example B, the bath contained a Co plating solution and the particles were of CrAlY containing 50 parts by weight Cr to 50 parts by weight of Al and 1.7 wt % Y with a size distribution, both in the bath and in the as-deposited coating, as given in Column B in the above Table. The rod was heat treated as for Example A and a micrograph of the coating after heat treatment is shown in FIG. 2. The coating has good properties. In a test, the coating was found to last in excess of 600 hours compared with a currently used aluminide coating which lasted only 200 hours.

Figure 3:
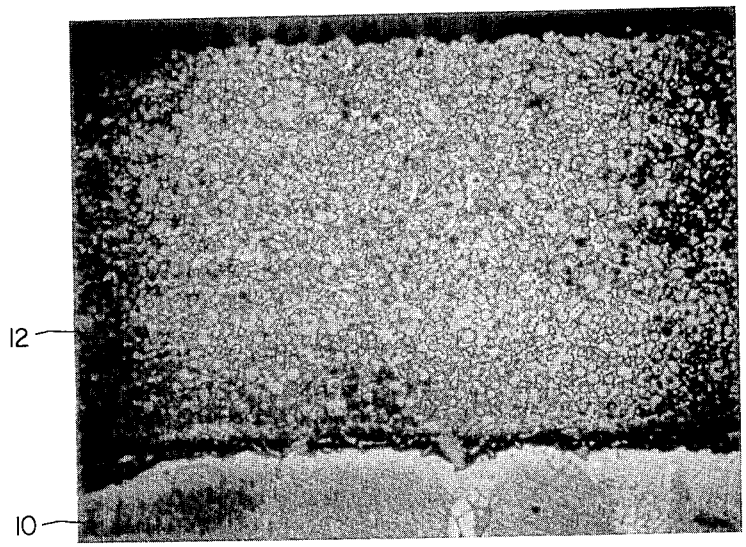

In Example C, the bath contained a Co plating solution and the particles were of CrAlY containing 60 parts by weight Cr to 40 Parts Al and 1.7 wt % Y with a size distribution, both in the bath and in the as-deposited coating, as given in Column C of the above Table. The rod was heat treated as for Examples A and B and a micrograph of the coating is shown in FIG. 3. It has been found that while the properties of the coatings of Examples A and B are good, those of Example C are outstanding. The coating is very dense, adherent and smooth with, as can clearly be seen from FIG. 3, a fine microstructure with an even distribution of particles and no zones of weakness. Substantial quantities of Al (as well as some Cr and Y) have diffused out of the particles into the Co matrix and Co as diffused into the particles so the coating consists of a 2-phase alloy, the matrix phase containing cobalt chromium aluminium and yttrium and the particles contain the same constituents but in different proportions. Upon oxidation at 1000° C. this alloy developed an oxide on the surface which was rich in aluminium oxide and which was particularly resistant to erosion and corrosion. In a test on a burner rig test at 1100° C., the coating was found to last over 600 hours compared to coating of similar overall composition produced by argon shrouded plasma spraying which only survived 400 hours.

It will now be appreciated that the invention provides overlay coatings having extremely beneficial properties. It should be noted that the coatings employ fine particles which are evenly distributed in an equiaxed matrix, thus producing a very high quality surface finish requiring little or no additional work; in general, the coating will be given a heat treatment but no other finishing treatment. This may be contrasted with sprayed and physical vapour deposition processes which put down coatings tending to have structures which produce coarse finishes requiring very lengthly finishing. These coatings usually require peening to eliminate compressive stresses in the surface and to encourage recrystallisation on heat treatment. Plasma sprayed deposits normally also require a polishing operation because of the rough surface produced by this process.

We claim:

1. A coated substrate produced by composite electrolytic deposition, on a substrate of a coating, consisting of a metal matrix $M_1$ containing particles comprising $CrAlM_2$, where $M_1$ is Ni or Co or Fe or two or all of these metals and $M_2$ is Y, Si, Ti, a rare earth element or two or more of these elements.

2. A coated substrate as claimed in claim 1 in which $M_2$ is Y.

3. A coated substrate as claimed in claim 1 in which the particles also contain one or more of Hf, Ta, Nb, Mn and Pt.

4. A method of producing a coating on a substrate which comprises electrolytic deposition of a metal matrix $M_1$ from a bath containing particles of $CrAlM_2$ so as to codeposit the particles with the matrix, $M_1$ being Ni or Co or Fe or two or all of these metals and $M_2$ being Y, Si, Ti, a rare earth element or two or more of these elements.

5. A method as claimed in claim 4 in which $M_2$ is Y.

6. A method as claimed in claim 4 in which the particles also contain one or more of Hf, Ta, Nb, Mn and Pt.

7. A method as claimed in claim 4 in which at least 99% by weight of the particles in the as-deposited coating are below 25 $\mu$m.

8. A method as claimed in claim 4 in which at least 97% by weight of the particles in the as-deposited coating are below 15 $\mu$m.

9. A method as claimed in claim 4 in which at least 84% by weight of the particles in the as-deposited coating are below 10.5 $\mu$m.

10. A method as claimed in claim 4 in which at least 95% by weight of the particles are between 3.0 and 13.6 $\mu$m.

11. A method as claimed in claim 4 in which at least 75% by weight of the particles are between 3.9 and 10.5 $\mu$m.

12. A method as claimed in claim 4 in which at least 65% by weight of the particles are between 5.0 and 10.5 $\mu$m.

13. A method as claimed in claim 4 which includes heat treating the as-deposited coating to obtain interdiffusion between the constituents of the matrix and the particles.

14. A method as claimed in claim 13 in which the heat treatment produces a coating having a minimum of 3 weight percent of Al in the matrix phase.

15. A method as claimed in claim 13 in which the heat treatment is effected at temperatures between 1050° C. and 1150° C.

16. A method as claimed in claim 13 in which the heat treatment is effected at temperatures between 1100° C. and 11402° C.

17. A method as claimed in claim 13 in which the heat treatment is effected at 1100° C. in vacuum for between one and two hours.

18. A method as claimed in claim 4 in which the proportion of Cr and Al in the as-deposited particles is between 80/20 and 50/50.

19. A method as claimed in claim 4 in which the proportion of $M_2$ in the as-deposited particles is less than 2.5 weight percent.

20. A method as claimed in claim 4 in which the proportion of M2 1 in the as-deposited particles is less than 2.0 weight percent.

21. A method as claimed in claim 4 in which the as-deposited particles consist of 37.3 weight percent Al, 1.7 weight percent Y and the balance Cr.

22. A substrate carrying an overlay coating of $M_1CrAlM_2$, where $M_1$ is Co, Ni or NiCo and $M_2$ is Y, Si, Ti or two or all of Y, Si and Ti, the coating having been applied by electrolytic deposition of a matrix of $M_1$ from a bath containing particles of $CrAlM_2$ so as to codeposit the particles with the matrix, the coating having in the as-deposited state more than 97% by weight of the deposited particles below 15 $\mu$m, the coating having been heat treated to produce a minimum of 3 weight percent of Al in the matrix.

23. A coated substrate produced by composite electrolytic deposition, on a substrate of a coating comprising a metal matrix $M_1$ containing particles of $CrAlM_2$ having in the as-deposited state more than 97% by weight of the deposited particles below 15 $\mu$m, where $M_1$ is Ni or Co or Fe or two or all of these metals and $M_2$ is Y, Si, Ti, a rare earth element or two or more of these elements.

* * * * *